United States Patent [19]
Teasley

[11] Patent Number: 5,977,267
[45] Date of Patent: Nov. 2, 1999

[54] PROCESS FOR MODIFYING ALIPHATIC POLYAMIDES WITH POLYUREA

[75] Inventor: Mark F. Teasley, Landenberg, Pa.

[73] Assignee: E. I. du Pont de Nemours and Company, Wilmington, Del.

[21] Appl. No.: 09/068,042

[22] PCT Filed: Oct. 16, 1996

[86] PCT No.: PCT/US96/16518

§ 371 Date: Apr. 30, 1998

§ 102(e) Date: Apr. 30, 1998

[87] PCT Pub. No.: WO97/16475

PCT Pub. Date: May 9, 1997

[51] Int. Cl.[6] .................................................. C08F 283/04
[52] U.S. Cl. .................. 525/424; 264/172.18; 264/176.1
[58] Field of Search ....................... 525/424; 264/172.18, 264/176.1

[56] References Cited

U.S. PATENT DOCUMENTS

| 3,860,671 | 1/1975 | Kowallik et al. .................. 525/424 |
| 4,742,128 | 5/1988 | Frisch et al. ....................... 525/424 |

FOREIGN PATENT DOCUMENTS

| 158394 | 10/1985 | European Pat. Off. ........ C08L 75/00 |
| 1553617 | 9/1979 | United Kingdom ............ G08L 77/00 |

*Primary Examiner*—Ana Woodward

[57] ABSTRACT

The end groups of an aliphatic polyamide may be changed by reacting a polyurea with a molten aliphatic polyamide at temperatures of about 260° C. or more. Carboxyl end groups are controllably converted to amine end groups. This is especially useful for controlling the dyeability of fibers spun from such aliphatic polyamides.

23 Claims, No Drawings

PROCESS FOR MODIFYING ALIPHATIC POLYAMIDES WITH POLYUREA

FIELD OF THE INVENTION

An aliphatic polyamide may be modified by means of the disclosed process to increase its proportion of amine end groups. In particular, the process involves reacting the aliphatic polyamide with a polyurea Such a process is useful, for instance, to improve the dyeing properties of the aliphatic polyamide.

TECHNICAL BACKGROUND

Aliphatic polyamides, often referred to as "nylons," are commercially important materials that, for example, may be used to make fibers or molded articles. The properties of such polymers can be significantly affected by their end groups, one such property being dyeability. For example, after a nylon is formed into a fiber, it is often dyed. The end groups of the nylon can affect the amount of dye that is adsorbed by the fiber and the rate at which the adsorption occurs. For many dyes, the greater the amount of amine end groups in the nylon, the greater the amount of dye that will be adsorbed. In order to obtain fibers with consistent coloration, therefore, it may be desirable to modify and control the polymer end groups. The end groups on an aliphatic polyamide can also affect its other properties such as adhesion of the aliphatic polyamide to other materials.

British Patent 1,553,617 describes the use of polyureas for improving the properties of filled, particularly glass fiber filled, nylon molding resin compositions. Modification of the nylon end groups is not mentioned.

SUMMARY OF THE INVENTION

This invention concerns a process for the modification of an aliphatic polyamide, which process comprises contacting a molten aliphatic polyamide with a polyurea at a temperature and for a period of time sufficient to increase the proportion of amine end groups in said aliphatic polyamide, wherein said temperature is at least the greater of 260° C. and the initial melting point of said polyurea.

DETAILS OF THE INVENTION

By the term "aliphatic polyamide" is meant herein a polyamide in which at least 15 mole percent (total), preferably at least 50 mole percent, and more preferably about 100 mole percent, of the total carbon atoms that are attached to the nitrogen atoms of the amide groups and to the carbonyl carbon atoms of the amide groups are attached to a saturated carbon atom. A saturated carbon atom would include, for example, a carbon atom in an allyl or cycloalkyl group. The aliphatic polyamide may be a homopolymer or copolymer. The aliphatic polyamide may be formally derived from an diamine and a dicarboxylic acid and/or an aminocarboxylic acid. The expression "formally derived" indicates that the polymer may be thought of as made from these types of compounds, but actually may be made from other compounds, often derivatives of these compounds.

Preferred aliphatic polyamides include poly(caprolactam) or nylon-6, nylon-6,6, nylon-12,12, nylon-6,12, nylon-4,6, the polyamide from 1,6-hexanediamine and terephthalic acid and/or isophthalic acid, the polyamide from adipic acid and 2-methyl-1,5-pentanediamine, and copolymers thereof (including as possible comonomers all of the diamines and diacids for the polymers recited). More preferred aliphatic polyamides are nylon-6 and nylon-6,6 and copolymers thereof. Nylon-6,6 is especially preferred.

The polyureas used herein are formally the reaction product of an organic diisocyanate and a dianiine, or the reaction of a diamine with phosgene or an equivalent thereof, in which both of the amino groups of the diamine are independently primary or secondary. For a review of polyureas, see C. I. Chiriac, H. Mark et al., editors, *Encyclopedia of Polymer Science and Engineering*, 2nd Ed., Vol. 13, John Wiley & Sons, New York p. 212–243. A general formula for many of the polyureas that may be employed herein may be written as follows:

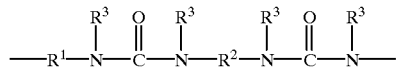

wherein each $R^1$ and $R^2$ is independently hydrocarbylene or substituted hydrocarbylene, and each $R^3$ is independently hydrocarbyl, substituted hydrocarbyl, or hydrogen. Preferably, $R^1$ and $R^2$ contain 1 to 30 carbon atoms, more preferably 2 to 15 carbon atoms, and/or $R^3$ contains 1 to 30 carbon atoms or is hydrogen. More preferably, $R^1$ and $R^2$ contain 2 to 6 carbon atoms, and/or $R^3$ contains 1 to 6 carbon atoms or is hydrogen. Especially preferably, $R^1$ and $R^2$ are hexamethylene and/or $R^3$ is hydrogen. When the polyurea is prepared from a diprimary diamine, all of the $R^3$ groups are hydrogen. When the polyurea is prepared from a diamine and a diisocyanate, for example, then $R^1$ and $R^2$ are each derived from these reactants, for instance, the diisocyanate $OCNR^1NCO$ and the diarnine $HR^3NR^2NR^3H$.

In the present process, preferably one or both of $R^1$ and $R^2$ are identical to at least one of the groups between amide groups in the aliphatic polyamide, and more preferably both $R^1$ and $R^2$ are identical to the groups between amide group nitrogens of the aliphatic polyamide. It is believed that part of the polyurea, at least formally, becomes an amine end group in the aliphatic polyamide. However, it may not remain an end group because of transamidation that occurs in such polymers, usually at higher temperatures, but the amount of such transamidation actually occurring in the Examples herein may not be significant. Therefore, in order to retain the "normal" properties of the aliphatic polyamide, the polyurea preferably has such an identical grouping, particularly the same grouping as in the diamnine of the aliphatic polyamide. For instance, for end group modification of nylon-6,6, one or both of $R^1$ and $R^2$ would preferably be —$(CH_2)_6$—. A polyurea in which both $R^1$ and $R^2$ were —$(CH_2)_6$— could be made by reacting 1,6-hexanediamine with 1,6-diisocyanatohexane (HMDI).

The term "hydrocarbyl" means herein a univalent radical containing only carbon and hydrogen. The term "hydrocarbylene" means herein a divalent radical containing only carbon and hydrogen. By the term "substituted," with reference to a radical, group, or compound, is meant that the radical, group, or compound may contain any substituent or substituents that do not interfere with the described process, i.e., that are essentially inert.

The process is suitably run at a temperature of about 260° C. or higher, or at a temperature that is the approximate initial melting point of the polyurea or higher, whichever temperature is higher. Preferably, the minimum temperature for the process is about 275° C. or, alternatively, the peak melt temperature of the polyurea. Preferably, the maximum temperature is less than 400° C., since most aliphatic polyamides would decompose at that temperature. If the polyurea "melts" at about 260° C. or above, some decomposition often takes place. The melting point, for present purposes, is the melting point measured by Differential Scanning Calorimetry (DSC) at a heating rate of 5° C./min. The melting point range is taken as from the initial temperature of the melting (and optionally decomposition) endotherm up to the peak temperature of the endotherm. The initial melting point is approximately taken as the point of intersection of the extrapolation of the baseline and the extrapolation of the line of the initial part of the melting endotherm. More preferably, the minimum temperature of the process, as determined by DSC, is the temperature at which one reaches 10% of the heat of fusion of the melting (and optionally decomposition) endotherm. For instance, if the heat of fusion was 100 J/g, then a preferred minimum temperature would be taken as the point at which 10 J/g of energy had been used in melting the polyurea.

In the present process, the ratio of aliphatic polyamide to polyurea is significant in controlling the final ratio of amine to carboxylic acid end groups in the aliphatic polyamide. Without wishing to be bound by theory, it is believed that for each urea group in the polyurea, one carboxyl end group in the polymer may, in theory, be converted to an amine end group, assuming no substantial change in molecular weight of the aliphatic polyamide.

Thus, knowing the number of amine end groups (A) and the number of carboxyl end groups (C) (both in meq/kg), one can calculate the total number of end groups as $$S = C + A$$

and the difference between the end groups as $$D = C - A$$

As the skilled artisan will readily understand, assuming that all of the end groups A and C are derived from the repeat units of the polyamide, the number average molecular weight of the polymer, which is inversely proportional to S, can be calculated. D, in effect, indicates the proportion of carboxyl end groups, since D is the number of carboxyl end groups minus the number of amine end groups. A negative number means that there are more amine than carboxyl ends. For any given molecular weight polyamide, the proportion of amine end groups increases as D gets more negative. The relationships between molecular weight and end groups, and the methods of their determination, are well known in the art, see for instance J. Zimmerman in H. Mark, et al., Ed., *Encyclopedia of Polymer Science and Engineering*, 2nd Ed., Vol. 11, John Wiley & Sons, New York, p. 315–381, especially at p. 321–323.

Thus, the decrease in D can be reasonably controlled by controlling the ratio of equivalents of polyurea added to the total number of carboxyl end groups. This is illustrated in Examples that follow. In a preferred process, at least 50 mole percent, preferably at least 75 mole percent, and more preferably at least 90 mole percent of the polyurea, upon heating, should react with the aliphatic polyamide to increase the proportion of amine end groups. The amount of polyurea remaining in the aliphatic polyamide can be measured by heating it and determining if D decreases. One can then back calculate the amount of polyurea present before such heating, correcting for any polymer degradation.

In a preferred embodiment of the present process, the value of D is decreased by at least 5, preferably by at least 10, and more preferably by at least 20, after correcting for any changes in D not caused by reaction with polyurea. Both C and A can be determined by titration of the allphatic polyamide, as described below.

The time required to carry out the reaction (i.e., modify the end groups) will vary with the particular urea and aliphatic polyamide that is used and with the temperature of the process. In general, the higher the temperature, the shorter the time. But one should not operate above the temperature at which the aliphatic polyamide suffers substantial decomposition. Generally speaking, at suitable temperatures, the process may require about 1 to 20 minutes for complete reaction of the polyurea and accompanying modification of the end groups of the polyamide. At such temperatures, an aliphatic polyamide may undergo a change in its molecular weight and may also undergo a change in its end group content and balance, as in the difference defined by D, which change is not related to reaction with residual polyureas. Therefore, when calculating net changes in end groups, such thermal reactions of the aliphatic polyamide may need to be taken into account. This is illustrated in the Examples. Such thermal changes in D are also known in the art, see J. Zimmerman, supra, especially beginning at p. 355.

The present process may be run in any apparatus in which a mixture of the molten (melted) polyamnide and polyurea can be held for the desired time at the necessary temperatures. Since one or more gases such as $CO_2$ may be produced in the process, provision should be made to vent these gases or to hold them in the polymer. The process may be run continuously, as in a reactor-extruder, or in a polymer transfer line. Alternatively, the process may be run batchwise. In any event, it is preferred that the polyurea be homogeneously dispersed, relatively speaking, in the molten aliphatic polyamide. If the polyurea is solid, which most are, then starting with relatively small sized particles will aid in obtaining a relatively homogeneous mixture.

The reaction mixture may contain any additives normally found in polyamides, especially aliphatic polyamides, for example, antioxidants, polymerization catalysts, photostabilizers, pigments, delusterants, fillers, etc. Such ingredients may depend on whether the polyamide is to be directly melt spun.

The resulting polymer may be melt spun into fibers or made into shapes such as pellets for future molding processes. As indicated above, the fibers may be dyed. The melt spinning of nylon fibers is well known. See, for instance, H. Mark et al., Ed., *Encyclopedia of Polymer Science and Engineering*, 2nd Ed., Vol. 6, John Wiley & Sons, New York, p. 802–839, which is hereby incorporated by reference.

In the following examples, relative viscosity (RV) was determined on solutions containing 8.40% by weight of the nylon polymers in 90.0% formic acid, based on ASTM Standard Test Method D 789. Amine and carboxyl end groups were determined (except as noted) by methods similar to those described in *The Encyclopedia of Industrial Chemical Analysis*, Vol. 17. John Wiley & Sons, New York, 1973, p. 293–294, which is herein incorporated by reference.

In the examples and experiments that follow, the following abbreviations are used:

| | |
|---|---|
| DSC— | Differential Scanning Calorimetry |
| HMD— | 1,6-diaminohexane |
| HMDI— | 1,6-diisocyanatohexane |
| polyurea 6— | the polyurea of HMD |
| polyurea Me5— | the polyurea of 1,5-diamino-2-methylpentane |
| polyurea 3-PIP-3— | the polyurea of 1,4-bis(3-aminopropyl)-piperazine |

EXPERIMENT 1

This example illustrates an interfacial polymerization to make polyurea 6. See also S. V. Joshi and A. V. Rao, *J. App. Polym. Sci.*, 28, 1457 (1983).

A solution of 11.62 g of hexamethylene diamine (HMD) in 150 mL water was prepared in a 500 mL three-neck round-bottom flask equipped with an overhead stirrer, an addition funnel, and a gas inlet. The solution was then purged with nitrogen and cooled in an ice bath. A solution of 16.82 g 1,6-diisocyanatohexane (HMDI) in 200 mL toluene was added dropwise over an 80 minute period to the well stirred aqueous solution. The polymer precipitated throughout the addition to give a heavy white slurry; 100 mL water was added after 30 minutes of addition in order to provide smooth agitation. After addition, the slurry was heated to 63° C. for three hours, then cooled to room temperature. The slurry was blended with an additional 200 mL water in a Waring® blender, then vacuum filtered to collect the polymer. The filter cake was added to 400 mL water, which was heated to a boil for 15 minutes and vacuum filtered while still hot. The filter cake was washed with water and methanol, then dried to a constant weight of 21.52 g in a 70° C. vacuum oven under a nitrogen purge. A 75.7% yield was obtained. The $\eta_{inh}$ (0.5% in sulfuric acid) was 0.84 dL/g, and the DSC showed a melting point range of 276–302° C. with a heat of fusion of 115 J/g.

EXPERIMENT 2

This example illustrates an interfacial polymerization to make polyurea 6 which was optimized for scale up. A 3 L glass resin kettle equipped with a three blade metal basket stirrer, a gas inlet, and a condenser with a gas outlet was charged with 1 L deionized water and purged with nitrogen. A 70% aqueous solution of HMD (83.01 g, 0.5 mol) was added to the kettle. HMDI (84.10 g, 0.5 mol) was dissolved in 1 L toluene, then added to the kettle over a 5 minute period using a 1 L addition funnel. The polymer precipitated throughout the addition to give a heavy white slurry. The stirring rate was adjusted as needed to maintain the maximum in smooth agitation. The high stirring rate was continued for an additional 5 minutes, and then 500 mL deionized water was added to the kettle. The kettle was heated to reflux for 30 minutes to hydrolyze any residual isocyanate groups, then cooled to room temperature. The slurry was vacuum filtered, and the filter cake was washed with deionized water. The polymer was dried in an 80° C. vacuum oven under a nitrogen purge to give 135.82 g, a 95.5% yield. The $\eta_{inh}$ (0.5% in sulfuric acid) was 1.22 dL/g, and the DSC showed a melting point range of 278–296° C. with a heat of fusion of 96 J/g.

The above procedure was scaled up about 15 fold in a 57 L kettle with a moderate rate of agitation, where it was repeated nine times to prepare a total of 18 kg polyurea 6. The nine batches had a $\eta_{inh}$ (0.5% in sulfuric acid) over a range of 0.64–0.82 dL/g. The DSC showed uniform melting point ranges in the total combined range of 277–303° C. with heats of fusion of 92–108 J/g. They were blended by grinding and sieving to give a 100 mesh powder.

EXAMPLE 1

This example illustrates a procedure for the modification of nylon-6,6 end groups employing polyurea 6. Commercial nylon-6,6 flake was dried overnight in an 80–100° C. vacuum oven under a nitrogen purge; this lowered the moisture content to $\leq 0.06\%$. The hot flake was allowed to cool and absorbed sufficient moisture from the air to increase in weight by 0.12–0.14%. The conditioned flake was sealed in jars for later use. Standard 38 mm×300 mm glass polymer tubes and stainless steel helical ribbon stirrers were dried overnight in an 80–100° C. vacuum oven under nitrogen purge. Conditioned flake in the amount of 50 g and the requisite amount of polyurea 6 were weighed out into the tubes using long stem plastic powder funnels to prevent material from adhering to walls. The tubes were sealed with the stirrers equipped employing adapters containing a gas inlet, a gas outlet, and a stirrer bearing. The tubes were purged with a slow stream of nitrogen and then were immersed in a 290° C. metal alloy bath for 11 minutes. The stirrers were operated for the specified reaction time. This procedure melted the flakes in the minimum reproducible time. The polymer melt temperatures were 280° C., as determined by model runs using thermocouples. The tubes were removed from the bath and plunged into liquid nitrogen to rapidly quench them. The modified polymers were removed from the tubes and stirrers, then ground in a Wiley® mill into flake form. The flakes were occasionally divided into two halves, with one half being boiled off in water to extract any soluble materials. The flakes were dried at 80–100° C. in a vacuum oven overnight under nitrogen purge, then sealed in vials to maintain dryness until analyzed by RV and end group titration. Table I below shows the results of end group modification at 280° C. The $D_c$ (calculated value) indicates that complete conversion required between 5 and 10 minutes. The $D_c$ values in this application was determined from the original value of D for the commercial flake (com. flake) minus the change expected to be effected by the amount of polyurea introduced during reaction and minus an estimate of the change introduced by thermal degradation as caused by time and temperature alone. This estimate was based on control experiments and typically were within 1 to 5 meq/kg.

TABLE I

Modification of Nylon-6,6 End Groups Using Polyurea 6 at 280° C. in Stirred Glass Tubes

| PU 6 (wt %) | Time (min) | RV | A (meq/kg) | C (meq/kg) | D (meq/kg) | $D_c$ (calcd) | Comment |
|---|---|---|---|---|---|---|---|
| — | — | 40.2 | 53.2 | 92.5 | 39.3 | — | Com. Flake |
| 0.328 | 5 | 75.9 | 54.0 | 55.0 | 1.0 | −9.3 | Boiled-Off |
| 0.430 | 10 | 53.3 | 72.9 | 48.6 | −24.4 | −26.1 | Boiled-Off |
| 0.384 | 10 | 85.8 | 61.2 | 40.1 | −21.1 | −19.7 | As-Is |
| — | — | 83.3 | 61.2 | 40.2 | −21.1 | −19.7 | Boiled-Off |
| 0.420 | 10 | 58.4 | 67.8 | 45.4 | −22.4 | −24.7 | As-Is |
| — | — | 57.3 | 67.6 | 43.6 | −22.1 | −24.7 | Boiled-Off |
| 0.500 | 8 | 93.4 | 61.9 | 29.9 | −32.0 | −33.3 | As-Is |

EXAMPLE 2

The effect of residence time on the modification of nylon-6,6 end groups using polyurea 6 is illustrated in this Example. The general procedure of Example 1 was followed for this Example. Table II shows the effect of residence time at 290° C. (300° C. bath temperature), and indicates that less than 5 minutes is needed for complete reaction. The RV of the modified polymers slowly increased with holdup time as the moisture contents of the melts were lowered by the anhydrous nitrogen atmosphere, and did not fall despite increasing modification by polyurea 6.

TABLE II

Residence Time Effect on Modification of Nylon-6,6 End Groups Using 0.4% Polyurea 6 at 290° C. in Stirred Glass Tubes

| Time (min) | RV | A (meq/kg) | C (meq/kg) | D (meq/kg) | $D_c$ (calcd) | Comment |
|---|---|---|---|---|---|---|
| — | 46.0 | 51.3 | 78.4 | 27.1 | — | Com. Flake |
| 2 | 59.6 | 52.5 | 60.1 | 7.6 | −29.4 | As-Is |
| 2 | 59.0 | 50.6 | 57.4 | 6.9 | −29.4 | Boiled-Off |
| 4 | 61.5 | 67.1 | 39.2 | −27.9 | −29.8 | As-Is |
| 4 | 61.5 | 66.1 | 40.8 | −25.3 | −29.8 | Boiled-Off |
| 6 | 71.8 | 62.8 | 34.9 | −27.9 | −30.2 | As-Is |
| 6 | 72.6 | 63.0 | 31.9 | −31.1 | −30.2 | Boiled-Off |
| 8 | 73.6 | 62.2 | 33.6 | −28.6 | −30.6 | As-Is |
| 8 | 75.3 | 62.8 | 32.6 | −30.3 | −30.6 | Boiled-Off |
| 10 | 79.1 | 62.9 | 30.9 | −32.0 | −31.0 | As-Is |
| 10 | 76.9 | 62.3 | 32.4 | −29.9 | −31.0 | Boiled-Off |
| 12 | 82.0 | 59.5 | 28.1 | −31.4 | −31.4 | As-Is |
| 12 | 85.2 | 58.2 | 29.5 | −28.7 | −31.4 | Boiled-Off |
| 12 | 90.9 | 33.9 | 50.9 | 17.1 | 21.1 | Control |
| 12 | 94.2 | 33.4 | 50.0 | 16.6 | 21.1 | Control/BO |

EXAMPLE 3

This example illustrates the effect of polyurea 6 level on the modification of nylon-6,6 end groups. The general procedure of Example 1 was followed for this Example. Table III below shows the effect of increasing the level of modification at a constant residence time of 10 minutes at 290° C. (300° C. bath temperature). The value of D was determined using RV and amine end group titration rather than titrating the carboxyls. The RV rises as the end groups are balanced and D passes through zero, then falls as D becomes increasingly negative, in accord with the equilibrium of polyamidation. Complete conversion is indicated for modification by up to 0.7% polyurea 6 in 10 minutes.

TABLE III

Modification of Nylon-6,6 End Groups by an Increasing Level of Polyurea 6 at 290° C. for 10 Minutes in Stirred Glass Tubes

| PU6 (wt. %) | RV | A (meq/kg) | D (meq/kg) | $D_c$ (calcd) |
|---|---|---|---|---|
| — | 46.0 | 51.3 | 27.1 | — |
| 0.0 | 88.4 | 35.1 | 23.3 | 24.1 |
| 0.1 | 92.1 | 37.3 | 17.8 | 10.1 |
| 0.2 | 97.2 | 49.1 | −7.2 | −4.0 |
| 0.3 | 90.8 | 52.1 | −11.4 | −18.0 |
| 0.4 | 78.1 | 63.1 | −29.3 | −32.0 |
| 0.5 | 82.6 | 70.7 | −46.1 | −46.0 |
| 0.6 | 73.5 | 79.3 | −59.9 | −59.9 |
| 0.7 | 62.9 | 85.5 | −67.1 | −73.8 |

EXAMPLE 4

This Example illustrates the reactive extrusion of nylon-6,6 yarns with end groups modified using polyurea 6. Trays containing 2 kg each of nylon-6,6 commercial flake were dried for two days in a 80° C. vacuum oven under nitrogen purge, then cooled to room temperature under vacuum. In turn, each tray was removed from the oven, tumble mixed with the requisite amount of 100 mesh polyurea 6 powder in a polyethylene bag, and charged to the nitrogen-purged hopper of a 28 mm Warner & Pfleiderer® (Ramsey, N.J.) twin screw extruder equipped with a gravimetric feeder. The polymers were melted and mixed in the extruder with the barrel temperature set points increasing from 275 to 290° C. and a screw rotation of 80–90 rpm to ensure thorough mixing. The polymer melts were then passed to the spinning block through a heated transfer line at an average polymer melt temperature of 290° C. The polymer throughput at the meter pump was 20 g/minute, and the filaments were extruded through a spinning pack containing a 17 hole spinneret. The total residence time in the melt was 8 minutes. Using methods well known to those skilled in the art, the molten filaments were quenched, drawn three fold at 85° C., and wound up on bobbins at 3000 mpm.

Table IV below shows the effect of polyurea 6 on the yarn properties. The yarn RV values were only slightly perturbed by the end group modification, which was complete under the extrusion conditions, and were in accord with the effect of the change in the difference of ends on the equilibrium of polyamidation. The yarn tensile properties of denier, break tenacity (T), elongation (E), and initial modulus (M) were uniform across the range of end group modification. Therefore, the carbon dioxide evolved by polyurea 6 did not disturb the spinning of the yarns, despite the effect that the dissolved gas had on the foamed polymer that was observed to extrude from the ballast port of the spinning block.

TABLE IV

The Reactive Extrusion of Nylon 6.6 Yarns Modified with Polyurea 6

| PU 6 wt. % | RV | A meq/kg | C meg/kg | D meq/kg | $D_c$ calcd | Denier | T gpd | E % | M gpd |
|---|---|---|---|---|---|---|---|---|---|
| — | 48.4 | 50.9 | 80.8 | 30.1 | — | — | — | — | — |
| 0 | 82.5 | 33.1 | 59.9 | 26.8 | 26.9 | 59.0 | 4.52 | 21.4 | 32.3 |
| 0.0427 | 87.1 | 34.9 | 56.2 | 21.3 | 20.9 | 58.2 | 4.87 | 20.6 | 34.6 |
| 0.427 | 79.8 | 63.9 | 32.7 | −31.1 | −33.2 | 56.0 | 4.60 | 21.2 | 33.4 |

EXPERIMENT 3

This Experiment illustrates an interfacial polymerization to make polyurea Me5. See also U.S. Pat. No. 2,937,161. The compound 2-methylpentamethylene diamine (5.82 g, 0.05 mol) and sodium hydroxide (4.00 g, 0.100 mol) were dissolved in 70 mL deionized water in a beaker. Triphosgene (4.95 g, 0.05 equiv.) was dissolved in 200 mL toluene in a Waring® blender jar. With the blender at moderate speed, the aqueous solution was added over a 20 second period. The polymer began to precipitate once the addition was complete, and the blender speed was adjusted to maintain smooth agitation. The beaker was rinsed with 50 mL deionized water and added to the blender to aid in the agitation of the heavy white slurry. After 5 minutes, the warm slurry was vacuum filtered to isolate the polymer. The polymer was washed three times with deionized water, then dried in an 85° C. vacuum oven under nitrogen purge to give 5.96 g polymer, a yield of 83.8 percent. The $\eta_{inh}$ (0.5% in sulfuric acid) was 0.89 dL/g, and the DSC showed a melting point range of 215–230° C. with a heat of fusion of 3 J/g.

EXPERIMENT 4

This experiment illustrates an interfacial polymerization to make polyurea 3-PIP-3. Sodium chloride in the amount of 36 g and sodium hydroxide (4.00 g, 0.100 mol) were dissolved in 100 mL water in a 200 mL RBF. The compound 1,4-bis(3-amninopropyl)piperazine (10.02 g, 0.05 mol) was added to the solution, and rinsed into the flask with an additional 10 mL water to return everything into solution. Triphosgene (4.95 g, 0.05 equiv.) was dissolved in 200 mL toluene in a Waring® blender jar. With the blender at moderate speed, the saturated aqueous solution was added over a 20 second period. The viscosity began to increase when the addition was three-quarters complete, and the blender speed was adjusted to maintain smooth agitation. After 5 minutes, the warm slurry was allowed to settle, so that the solvents could be decanted from the polymer. The polymer was then blended with 400 mL ethyl acetate to extract any soluble material. The white gummy mass was vacuum filtered and dried in a 60° C. vacuum oven under nitrogen purge to give 6.00 g, a yield of 53.0 percent. The $\eta_{inh}$ (0.5% in sulfuric acid) was 0.50 dL/g, and the DSC showed a melting point range of 161–180° C. with a heat of fusion of 15 J/g.

EXAMPLE 5

This example illustrates the modification of nylon-6,6 using alternative polyurea compositions. The general procedure of Example 3 was followed for this Example. Table V below shows the effect of modifying nylon-6,6 with polyurea Me5 and polyurea 3-PIP-3. Both react stoichiometrically with nylon-6,6 under the given conditions. The high RV values for the modified polymers indicate that less moisture was absorbed than expected during the conditioning of the flake.

Polyurea Me5 gives a level of end group modification equivalent to polyurea 6 because its repeat units have the same formula weight. Polyurea 3-PIP-3 is less potent as an end group modifier, however, because of the higher formula weight for its repeat unit. The titration of the amine groups, however, does not include the tertiary amines that it introduces into the polymer chain because their end point is different than that of the primary amine end groups. The values for D in Table V for the 3-PIP-3 modified polymers were determined from RV and the amine end groups levels because the tertiary amines interfere with the titration of the carboxylic acid end groups. The other polymers in Table V were determined from both carboxylic and amine end group levels.

TABLE V

Modification of Nylon 6,6 Using Alternative Polyurea Compositions at 290° C. for 10 Minutes in Stirred Glass Tubes

| Comments | PU wt. % | RV | A meq/kg | D meq/kg | $D_c$ calcd |
| --- | --- | --- | --- | --- | --- |
| Com. Flake | — | 46.0 | 51.3 | 27.1 | — |
| Control | — | 179.8 | 22.8 | 24.7 | 24.1 |
| Boiled-Off | — | 171.2 | 23.3 | 23.4 | 24.1 |
| PU Me5 | 0.040 | 160.3 | 26.8 | 17.6 | 18.5 |
| Boiled-Off | 0.040 | 169.3 | 27.3 | 17.3 | 18.5 |
| PU Me5 | 0.400 | 144.6 | 52.9 | −28.7 | −32.0 |
| Boiled-Off | 0.400 | 140.5 | 53.6 | −28.9 | −32.0 |
| PU 3-PIP-3 | 0.600 | 87.4 | 60.2 | −26.7 | −28.7 |
| Boiled-Off | 0.600 | 84.3 | 60.9 | −27.1 | −28.7 |
| PU 3-PIP-3 | 1.00 | 86.7 | 79.0 | −64.0 | −63.6 |
| Boiled-Off | 1.00 | 82.4 | 78.6 | −61.7 | −63.6 |

What is claimed is:

1. A process for the modification of aliphatic polyamides, which process comprises contacting a molten aliphatic polyamide with a polyurea to increase the proportion of amine end groups in said aliphatic polyamide;

wherein said contacting is at a temperature of about at least the greater of 260° C. and the initial melting point of said polyurea; and provided that the number of carboxyl end groups minus the number of amine end groups, in meg/kg is decreased by at least 5.

2. The process as recited in claim 1 wherein said aliphatic polyamide is selected from the group consisting of nylon-6, nylon-6,6, nylon-12,12, nylon-6,12, nylon-4,6, a polyamide from 1,6-hexanediamine and terephthalic acid, a polyamide from 1,6-hexanediamine and isophthalic acid, a polyamide from 1,6-hexanediamine, terephthalic acid and isophthalic acid, a polyamide from adipic acid and 2-methyl-1,5-pentanediamine, and copolymers of the comonomers thereof.

3. The process as recited in claim 1 wherein said aliphatic polyamide is nylon-6 or nylon-6,6.

4. The process as recited in claim 3 comprising the additional step of melt spinning said aliphatic polyamide into a fiber.

5. The process as recited in claim 1 wherein said aliphatic polyamide is nylon-6,6.

6. The process as recited in claim 1 wherein said polyurea is of the formula:

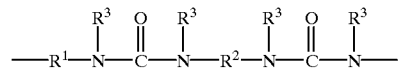

wherein each $R^1$ and $R^2$ is independently hydrocarbylene or substituted hydrocarbylene, and each $R^3$ is independently hydrocarbyl, substituted hydrocarbyl or hydrogen.

7. The process as recited in claim 6 wherein one or both of $R^1$ and $R^2$ is identical to a radical that is between amide groups of said polyamide.

8. The process as recited in claim 6 wherein both of $R^1$ and $R^2$ are identical to a radical that is between amide groups of said polyamide.

9. The process as recited in claim 6 wherein both $R^1$ and $R^2$ are —$(CH_2)_6$—.

10. The process as recited in claim 9 wherein said aliphatic polyamide is nylon-6,6.

11. The process as recited in claim 6 wherein said temperature is about at least the greater of 275° C. and the melting point of said polyurea.

12. The process as recited in claim 11 wherein the number of carboxyl end groups minus the number of amine end groups, in meq/kg, is decreased by at least 5.

13. The process as recited in claim 11 comprising the additional step of melt spinning said aliphatic polyamide into a fiber.

14. The process as recited in claim 11 wherein at least 50 mole percent of said polyurea is reacted.

15. The process as recited in claim 11 wherein at least 90 mole percent of said polyurea is reacted.

16. The process as recited in claim 1 wherein said temperature is about at least the greater of 275° C. and the peak melting point of said polyurea.

17. The process as recited in claim 1 wherein at least about 75 mole percent of said polyurea groups are reacted.

18. The process as recited in claim 1 wherein the number of carboxyl end groups minus the number of amine end groups, in meq/kg, is decreased by at least 20.

19. The process as recited in claim 1 wherein the number of carboxyl end groups minus the number of amiine end groups, in meq/kg, is decreased by at least 10.

20. The process as recited in claim 1 comprising the additional step of melt spinning said aliphatic polyamide into a fiber.

21. The process as recited in claim 1 comprising the additional step of melt molding or melt extruding said aliphatic polyamide into a shaped part.

22. The process as recited in claim 1 wherein at least 50 mole percent of said polyurea is reacted.

23. The process as recited in claim 1 wherein at least 90 mole percent of said polyurea is reacted.

* * * * *